United States Patent
Chou et al.

(10) Patent No.: US 9,804,769 B2
(45) Date of Patent: Oct. 31, 2017

(54) INTERFACE SWITCHING METHOD AND ELECTRONIC DEVICE USING THE SAME

(71) Applicant: ASUSTeK COMPUTER INC., Taipei (TW)

(72) Inventors: Shu-Hui Chou, Taipei (TW); Shuan-Yi Chu, Taipei (TW); Chi-Nien Chen, Taipei (TW); Wei-Chi Yen, Taipei (TW); Xiao-Gang Sun, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 14/757,473

(22) Filed: Dec. 23, 2015

(65) Prior Publication Data

US 2016/0188152 A1 Jun. 30, 2016

(30) Foreign Application Priority Data

Dec. 31, 2014 (TW) .............................. 103146626 A

(51) Int. Cl.
  *G06F 3/0488* (2013.01)
  *G06F 3/041* (2006.01)
  *G06F 3/0481* (2013.01)
  *G06F 3/0482* (2013.01)

(52) U.S. Cl.
  CPC ............ *G06F 3/0488* (2013.01); *G06F 3/041* (2013.01); *G06F 3/0482* (2013.01); *G06F 3/04817* (2013.01)

(58) Field of Classification Search
  None
  See application file for complete search history.

(56) References Cited

U.S. PATENT DOCUMENTS

| | | |
|---|---|---|
| 2009/0172594 A1 | 7/2009 | Chen |
| 2011/0141025 A1 | 6/2011 | Tsai |
| 2013/0117705 A1 | 5/2013 | Ting et al. |
| 2013/0212529 A1* | 8/2013 | Amarnath ............... G06F 3/017 715/810 |
| 2014/0075388 A1* | 3/2014 | Kuscher ............... G06F 3/0482 715/834 |
| 2015/0205509 A1* | 7/2015 | Scriven .................. G04G 21/08 715/834 |

FOREIGN PATENT DOCUMENTS

| | | |
|---|---|---|
| CN | 101763215 A | 6/2010 |
| TW | 200928941 A | 7/2009 |
| TW | 201319857 A | 5/2013 |

* cited by examiner

*Primary Examiner* — Kenneth B Lee, Jr.
(74) *Attorney, Agent, or Firm* — Muncy, Geissler, Olds & Lowe, P.C.

(57) ABSTRACT

An electronic device, comprising a touch screen configured to display a circular operation area and a display area; a storage unit configured to store a plurality of applications; and a processing unit coupled to the touch screen and the storage unit, wherein the touch screen receives a touch operation on the circular operation area, the processing unit enables the touch screen to display a circular menu on a periphery of the display area according to the touch operation, and the circular menu includes a plurality of icons corresponding to the applications.

10 Claims, 14 Drawing Sheets

INTERFACE SWITCHING METHOD AND ELECTRONIC DEVICE USING THE SAME

CROSS-REFERENCE TO RELATED APPLICATION

This application claims the priority benefit of TW application serial No. 103146626, filed on Dec. 31, 2014. The entirety of the above-mentioned patent applications are hereby incorporated by reference herein and made a part of specification.

BACKGROUND OF THE INVENTION

Field of the Invention

The disclosure relates to an interface switching method and, more particularly, to an interface switching method executed by an electronic device.

Description of the Related Art

Applications or functions executed on an electronic device are generally triggered by tapping corresponding icons on a user interface. However, the number of the icons to be set at a single page is limited, therefore, multiple pages are utilized for arrange icons, thus users have to swipe pages up/down or left/right to find out desired applications, which is inconvenient and waste time.

BRIEF SUMMARY OF THE INVENTION

According to a first aspect of the present disclosure, an electronic device, comprising a touch screen configured to display a circular operation area and a display area; a storage unit configured to store a plurality of applications; and a processing unit coupled to the touch screen and the storage unit, wherein the touch screen receives a touch operation on the circular operation area, the processing unit enables the touch screen to display a circular menu on a periphery of the display area according to the touch operation, and the circular menu includes a plurality of icons corresponding to the applications.

Furthermore, according to a second aspect of the present disclosure, an interface switching method, applied to an electronic device with a touch screen, wherein the method includes the steps receiving a touch operation by the touch screen; displaying a circular menu on a periphery of a display area according to the touch operation, wherein the circular menu includes a plurality of icons corresponding to a plurality of applications; determining a moving path of the touch operation along the circular operation area; and displaying content of the application on the display area according to a segment of the icon corresponding to the moving path.

In sum, the interface switching method and the electronic device using the same are provided. When the touch operation is executed on the circular operation area, the display area displays the circular menu accordingly.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1A:
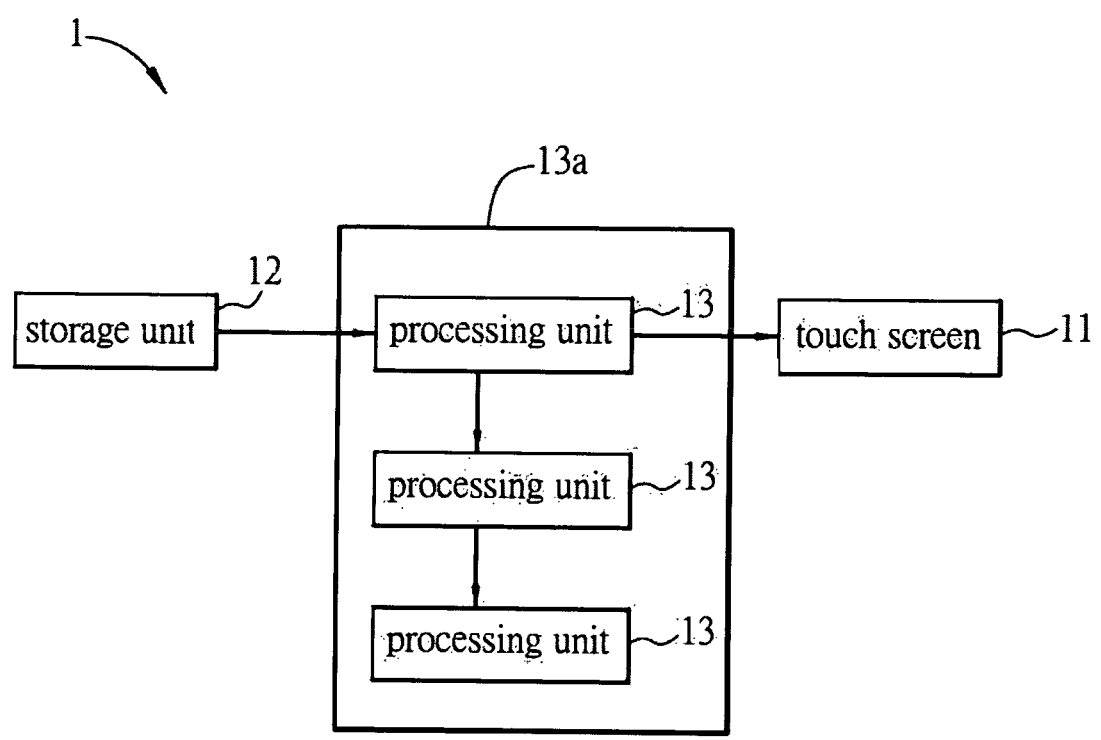
FIG. 1A is a block diagram showing an electronic device in an embodiment.
Figure 1B:
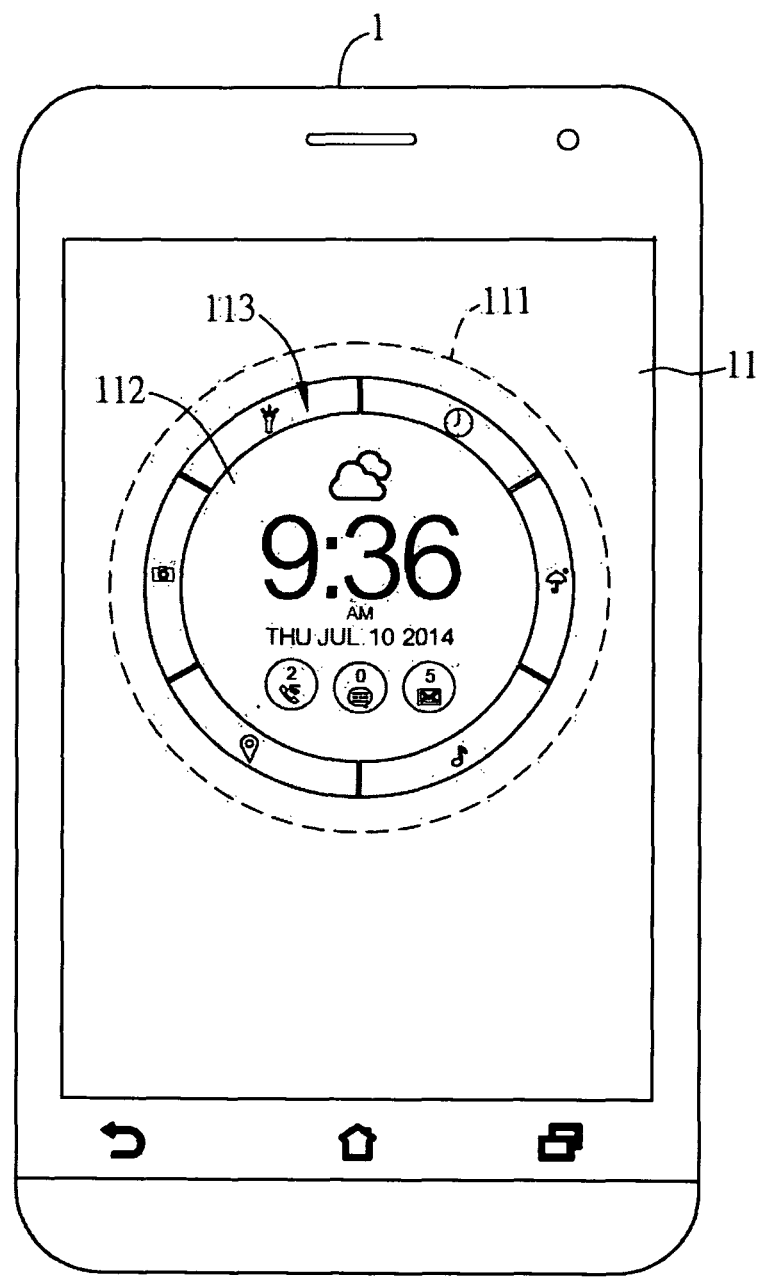
FIG. 1B is a schematic diagram showing an electronic device in an embodiment.
Figure 7:
FIG. 7 is a schematic diagram showing an electronic device in an embodiment.

FIG. 1A is a block diagram showing an electronic device in an embodiment. Please refer to FIG. 1A and FIG. 1B, an interface switching method is adapted to an electronic device 1, and the electronic device 1 includes a touch screen 11, a storage unit 12 and one or more processing units 13. The storage unit 12 is coupled to the processing units 13. In an embodiment, the electronic device 1 includes a plurality of processing units 13, and the processing units 13 forms a processing module 13a which is electrically connected to the storage unit 12. The electronic device 1 may be a smart phone, a smart watch (such as an electronic device 2 shown in FIG. 7), a wearable device or other electronic devices, which is not limited herein. The smart phone is illustrated hereafter.

In the embodiment, the touch screen 11 has a touch function and a display function, and the touch screen 11 generates a circular operation area 111 and a display area 112. In the embodiment, the display area 112 is within the circular operation area 111, which is not limited herein. The circular operation area 111 is used to receive a touch event, and the display area 112 is used to display an image. In an embodiment, the display area 112 also has a touch function, which is not limited herein. In an embodiment, the touch screen 11 may be a capacitive touch screen, a piezoelectric touch screen, an acoustic touch screen, or an optical touch screen, which is not limited herein.

In an embodiment, the storage unit 12 may be a hard disk or a memory, and the storage unit 12 stores a plurality of instructions and a plurality of pre-selected applications. The processing unit 13 is coupled to the touch screen 11 and the storage unit 12, and the processing unit 13 may be a central processing unit (CPU), a multi-core processor and/or a graphics processing unit (GPU). The processing unit 13 processes receive and process touch events to display at the touch screen 11 according to the touch gesture. In an embodiment, the processing unit 13 executes the instructions to enable the electronic device 1 to execute the interface switching method.

Figure 1C:
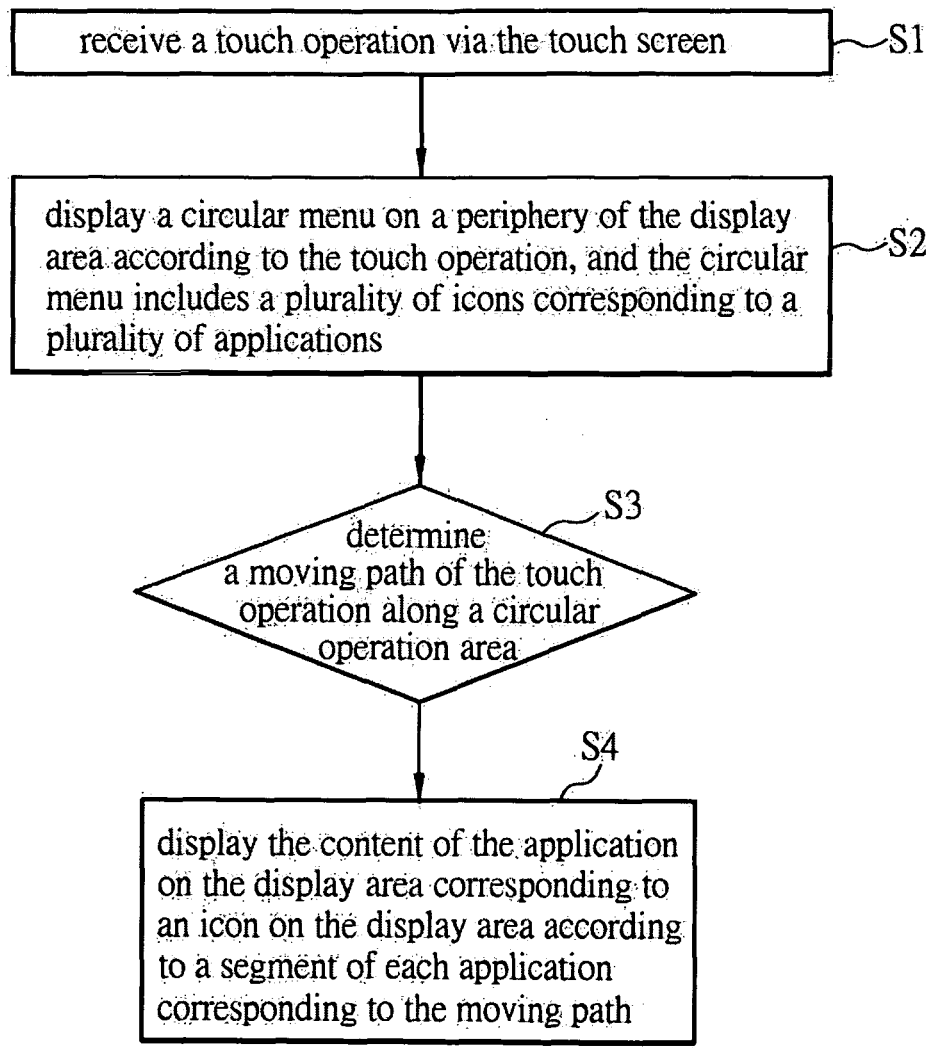
FIG. 1C is a flow chart showing an interface switching method in an embodiment.

Please refer to FIG. 1A to FIG. 1C, and FIG. 2A to FIG. 2D. FIG. 1C is a flow chart showing an interface switching method in an embodiment, and FIG. 2A to FIG. 2D are schematic diagrams showing a graphical user interface of an electronic device, respectively. The interface switching method includes the following steps: receiving a touch operation at the touch screen (S1); displaying a circular menu on a periphery of the display area according to the touch operation, and the circular menu includes a plurality of icons corresponding to a plurality of applications (S2); determining a moving path of the touch operation along a circular operation area (S3); and displaying content of the application corresponding to the icon on the display area according to a segment of the icon corresponding to the moving path (S4).

Figure 2A:
FIG. 2A to FIG. 2D are schematic diagrams showing a graphical user interface (GUI) of an electronic device in an embodiment, respectively.

As shown in FIG. 2A, the display area 112 initially displays the content of a default application. In the embodiment, the storage unit 12 stores six pre-selected applications, such as a time application, a weather application, a music application, a mapping application, a camera application and a torch application, and the display area 12 displays the content of the time application by default. The number and category of the pre-selected applications are factory default settings or set by users according to requirements. For example, four applications are pre-selected, which is not limited herein.

The circular operation area 111 of the touch screen 11 receives a touch operation. The touch operation is generated by a finger, a stylus, which is not limited herein. In addition, the touch operation is a contact operation or a non-contact operation. In an embodiment, the non-contact operation is implemented by improving an induction sensitivity of the touch screen 11. One touch operation includes an initial touch position (an initial position), a touch moving path (a moving path) and a final touch position, and the initial touch position is the position where the finger (or other touch objects) starts to touch, the final touch position is the position where the finger (or other touch objects) leaves the touch screen 11 to finish the touch operation, and the touch moving path is the path that the finger (or other touch objects) slides or moves between the initial touch position and the final touch position.

Figure 2B:
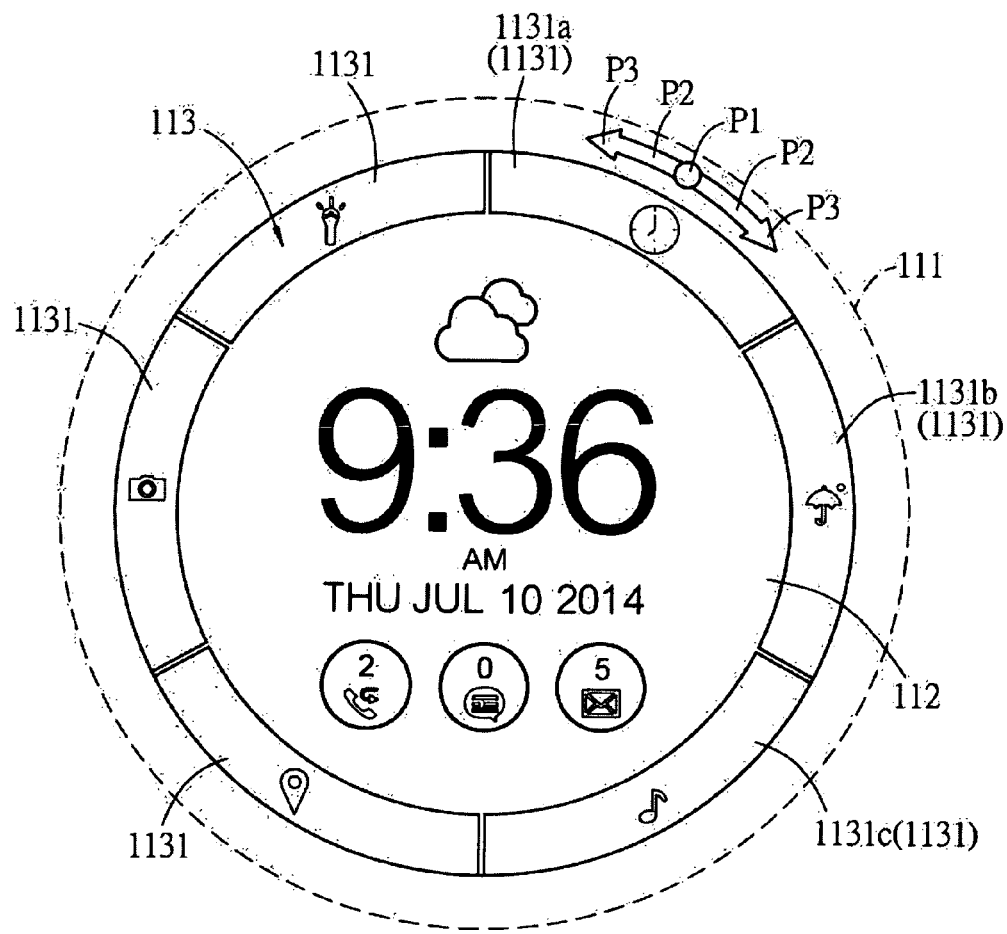

Please refer to FIG. 2B, a circle of tab P1 is the initial touch position, the arrow body of the tab P2 is the touch moving path, the arrowhead of tab P3 is the final touch position. In step S1, the touch screen 11 receives a touch operation on the circular operation area 111. In step S2, when the touch screen 11 receives the touch operation on the circular operation area 111, the processing unit 13 enables the touch screen 11 to display a circular menu 113 on a periphery of the display area 112 according to the touch operation. In the embodiment, the circular menu 113 is disposed on the interior of the circular operation area 111, which is not limited herein. As shown in FIG. 2D, when the touch screen 11 receives the touch operation, the circular operation area 111 displays the circular menu 113. The circular menu 113 includes a plurality of icons 1131 corresponding to a plurality of applications. In the embodiment, the circular menu 113 includes six icons 1131, each icon 1131 is displayed at a segment.

In step S3, the processing module 13 determines a moving path P2 of the touch operation along the circular operation area 111, and the moving path P2 may be at an anti-clockwise direction or a clockwise direction.

Figure 1D:
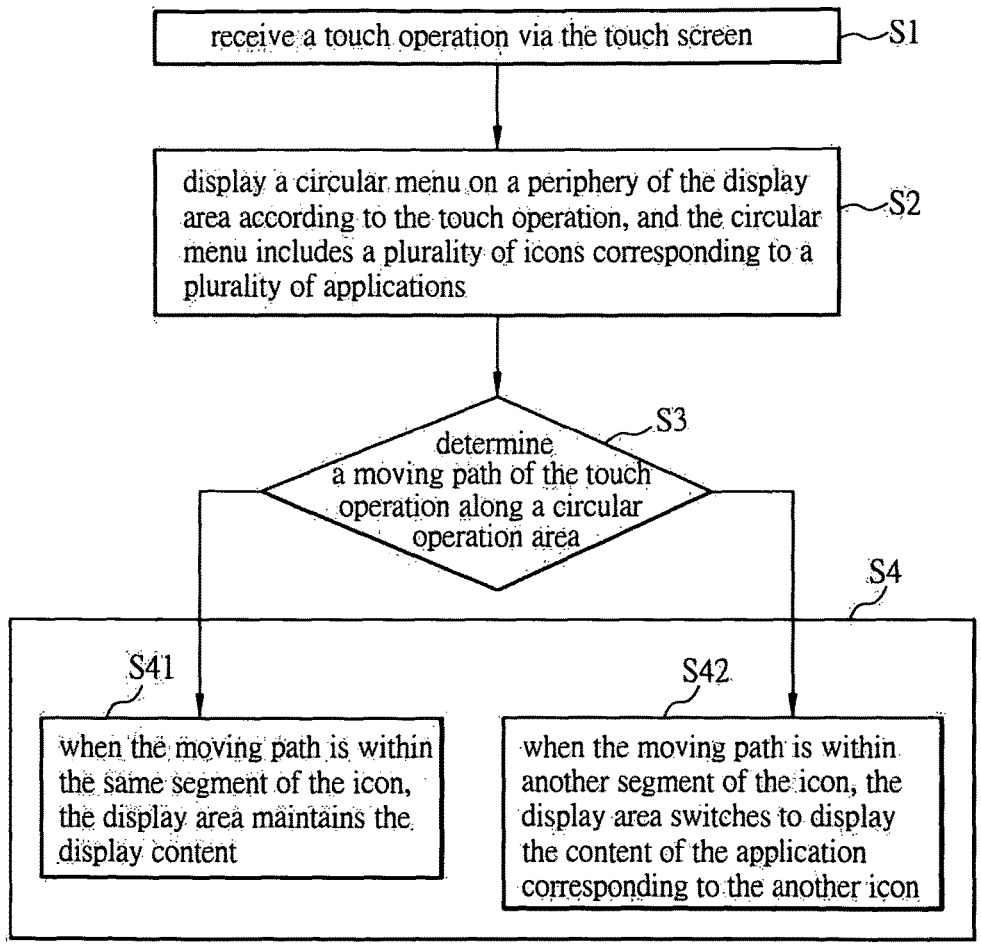
FIG. 1D is a flow chart showing an interface switching method in an embodiment.

In step S4, the display area 112 displays the content of the application according to the segment of each icon 1131 corresponding to the moving path. Please refer to FIG. 1D, FIG. 1D is a flow chart showing an interface switching method in an embodiment. Step S4 includes step S41 and step S42. In step S41, when the moving path P2 is still within the same segment of the icon 1131, the display area 112 maintains the display content. In the embodiment, when the moving path P2 goes around the circular operation area 111 by a circle, the moving path P2 corresponds to six icons 1131 respectively in sequence. When the moving path P2 is within the segment of the same icon 1131, in an embodiment, the moving path P2 is within the icon 1131a of the time application, the display area 112 displays the content of the time application. Similarly, when the moving path P2 is within the segment of the icon 1131b of the weather application, the display area 112 displays the content of the weather application.

Figure 2C:
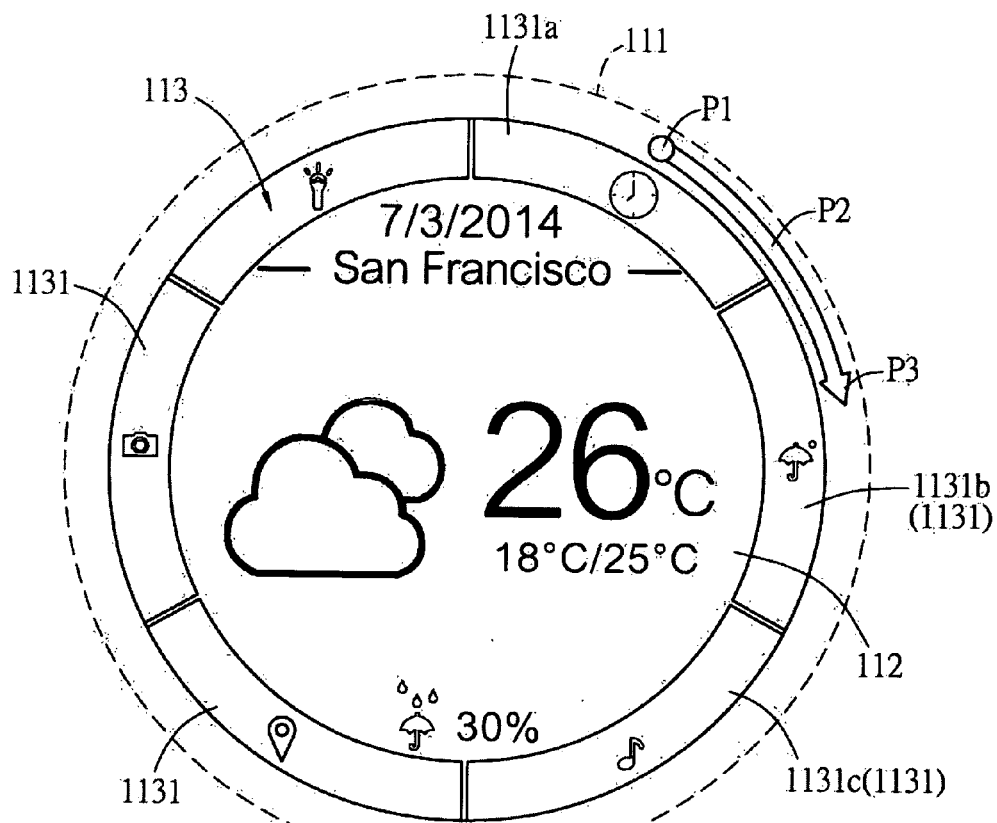
Figure 2D:
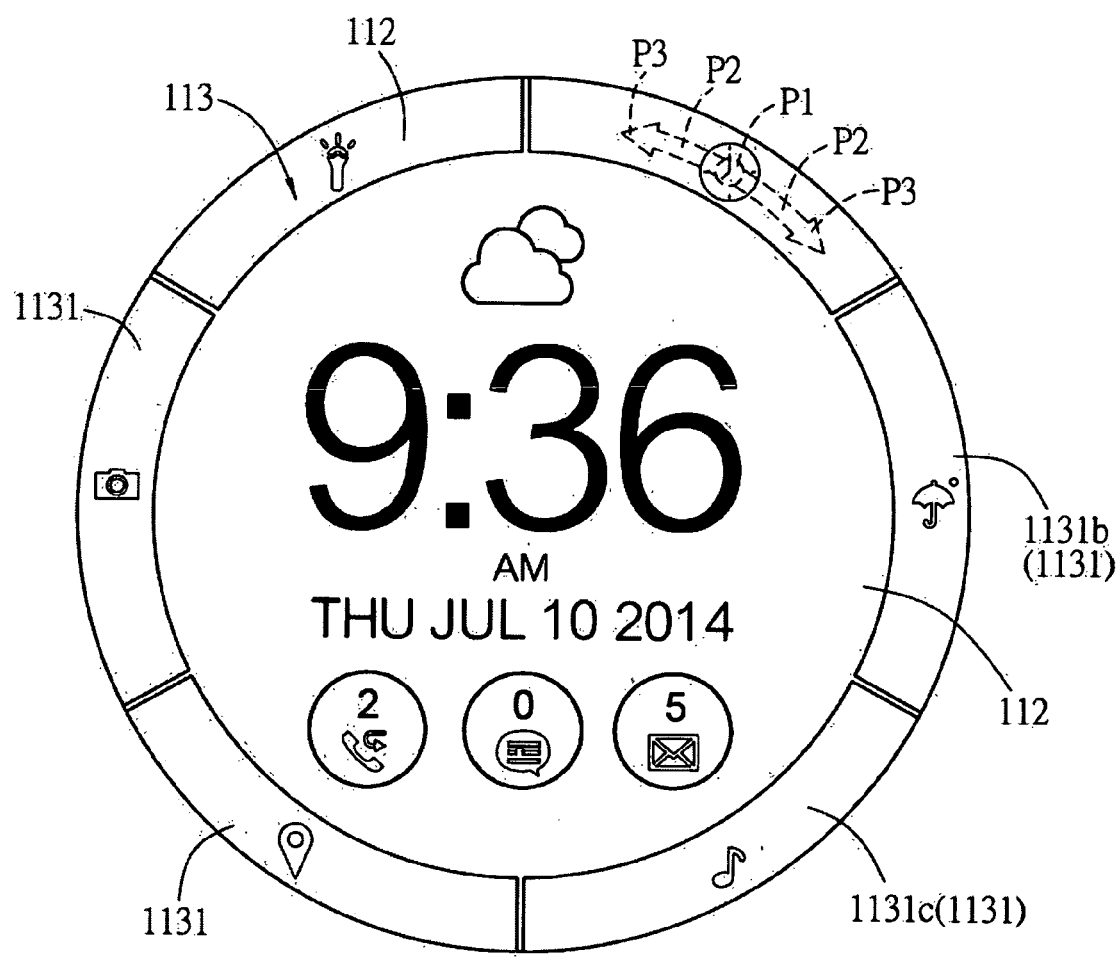

In step S42, as shown in FIG. 2C, when the moving path P2 moves to the segment of another icon 1131, the display area 112 switches to display the content of the application corresponding to the icon 1131. In the embodiment, the touch operation moves at a clockwise direction, after the moving path P2 slides from the icon 1131a of the time application to the icon 1131b of the weather application, the display area 112 switches to display the content of the weather application. Similarly, the display area 112 switches to display the content of the music application when the moving path P2 moves to the icon 1131c of the music application.

According to the interface switching method, when the touch operation is generated in the range of the circular operation area 111, the display area 112 displays the circular menu 113 including the plurality of icons 1131 corresponding to the plurality of applications, and when the touch operation moves along the circular operation area 111, the display area 112 displays the content of the application of the corresponding icon 1131.

Figure 3:
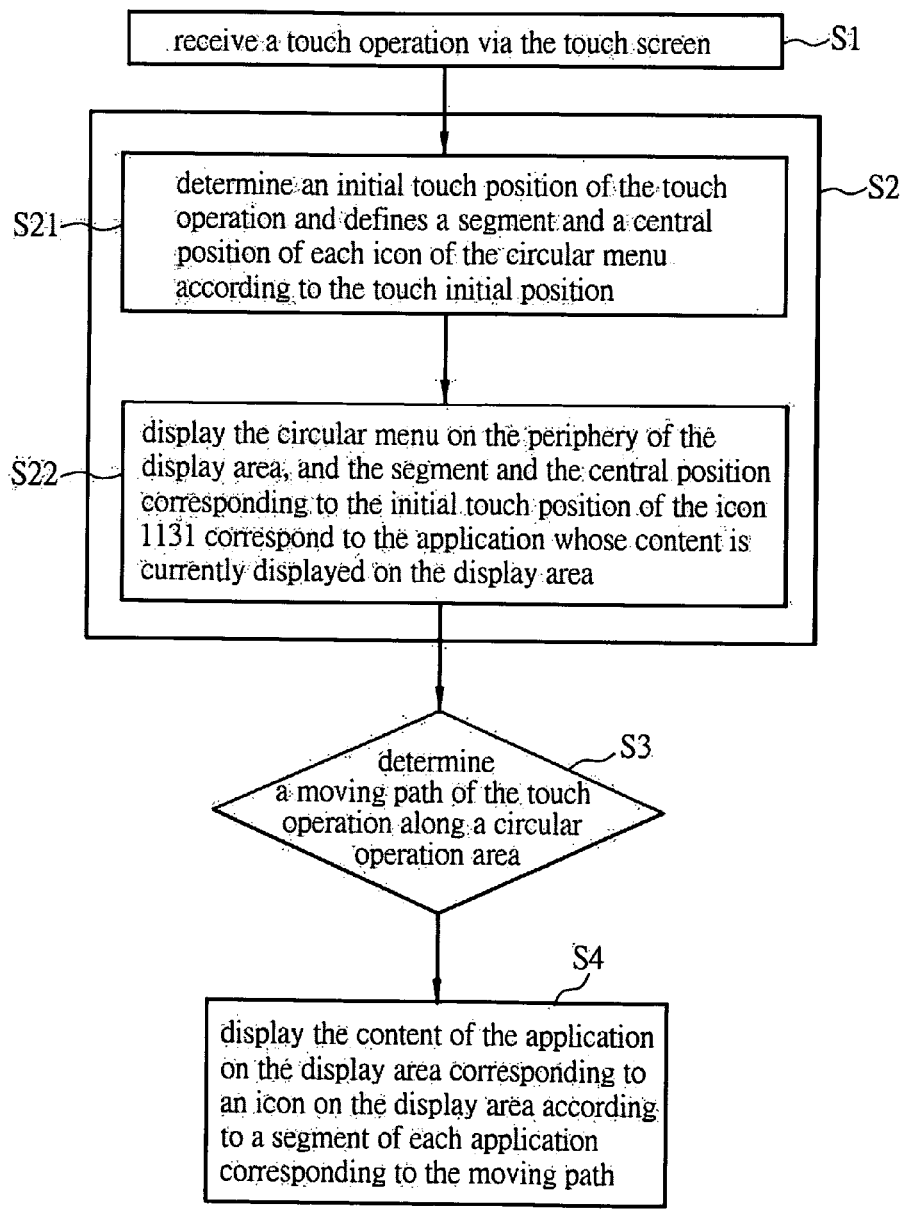
FIG. 3 is a flow chart showing an interface switching method in an embodiment.

Please refer to FIG. 3, FIG. 3 is a flow chart showing an interface switching method in an embodiment. In the embodiment, the step of displaying the circular menu 113 further includes the following steps. The processing unit 13 determines an initial touch position P1 of the touch operation and defines a segment and a central position of each icon 1131 of the circular menu 113 according to the touch initial position P1 (step S21). The touch screen 11 displays the circular menu 113 on the periphery of the display area 112, and the segment and the central position corresponding to the initial touch position of the icon 1131 correspond to the application whose content is currently displayed on the display area 112 (step S22).

Please refer to FIG. 2A and FIG. 2B, in step S21, when any position of the circular operation area 111 receives the touch operation and the position is determined as the initial touch position P1, the circular menu 113 displays a plurality of icons, and the application corresponding to the icon of the initial touch position P1 of the circular menu 113 is currently displayed on the display area 112. In FIG. 2A, the content of the application which is displayed on the display area 112 is the content of the time application. In FIG. 2B, after the processing unit 13 determines the initial touch position P1, the segment of each icon 1131 of the circular menu 113 is determined accordingly, and the initial touch position P1 is the central position of the icon 1131 of the application which is displayed currently.

Figure 4:
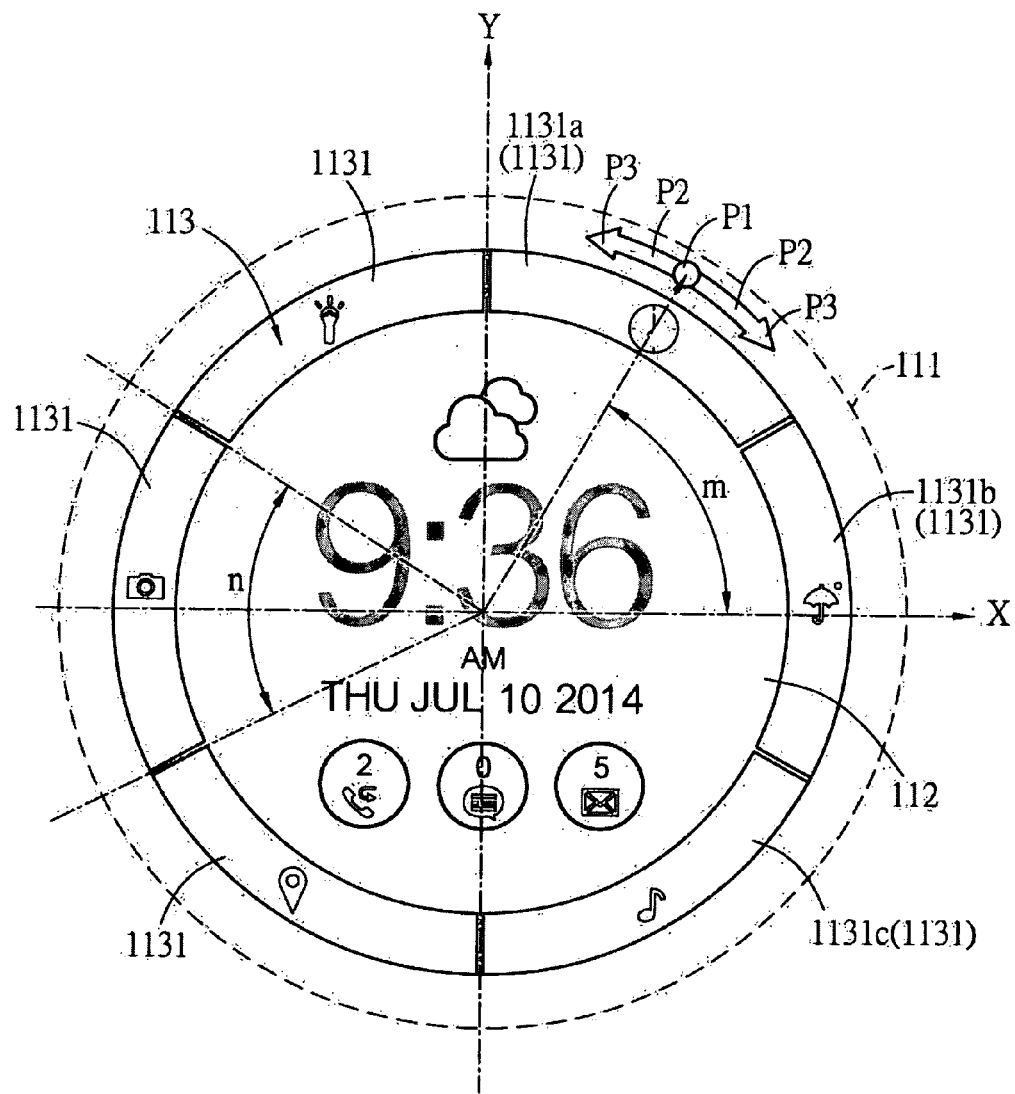
FIG. 4 is a schematic diagram showing a graphical user interface parameterization of the electronic device in FIG. 1B.

Please refer to FIG. 4, FIG. 4 is a schematic diagram showing a graphical user interface parameterization of the electronic device. A circle center of the display area 112 is regarded as an origin of coordinate, and the initial touch position P1 corresponds to a coordinate point accordingly. The processing unit 13 computes a vector from the origin of coordinate to the coordinate point according to the origin of coordinate and the coordinate point. An angle m (at a clockwise direction) between the vector and the X-axis is computed; an angle n of each icon is computed (for example, 360° is distributed equally between six icons, and each icon occupies 60°); the coordinate point of the initial touch position P1 is taken as a starting point, the segment of the icon 1131 and the central point of the segment are defined according to the angle m and angle n, and the angle m and angle n are calculated by cyclic reduction of clockwise or anticlockwise. The central coordinate of the icon of the application which is currently displayed is located at the vector. In an embodiment, a divider line is between adjacent segments of the icons 1131, the way of generating the divider line is, the same as that of the central point of the icon 1131, which is omitted herein.

Consequently, no matter which position of the circular operation area 111 is taken as the initial touch position P1, the icon of the current application can be displayed on the initial touch position P1.

In an embodiment, the segments of the icon 1131 of the applications are arranged in a cyclic sequence. In an embodiment, the icon of the time application is next to the icon of the weather application at the clockwise direction, regardless of the position of the initial touch position P1 is, the arrangement relationship between the two applications from the initial touch position P1 is the same. The arranged sequence is just an embodiment, which is not limited herein.

In an embodiment, the processing unit 13 can detect the moving direction of the touch operation along the circular operation area, such as a clockwise direction or an anticlockwise direction. The processing unit 13 determines the moving direction according to a change of a distance and a direction between the coordinate point of the current touch position and the coordinate point of the initial touch position P1, or the moving direction of the touch operation is determined according to the change of the angle between the vector and X-axis or Y-axis.

In an embodiment, the processing unit 13 determines to zoom in or zoom out the image of the display area 112 according to the moving direction of the touch operation within the segment of the icon 1131. In an embodiment, the image of the display area 112 zooms in or zooms out according to a setting value. In an embodiment, when the processing unit 13 detects that the touch operation moves at the clockwise direction, the image of display area 112 zooms in; when the processing unit 13 detects the touch operation moves at the anti-clockwise direction, the image of the display area 112 zooms out. In an embodiment, the center point of the segment corresponding to the application is taken as a reference point, the image zooms out when the touch operation leaves the center point, and the image zooms in when the touch operation moves towards to the center point. In an embodiment, the image zooms in when the touch operation leaves the center, the image zooms out when the touch operation moves towards to the center, which is not limited herein.

Figure 5A:
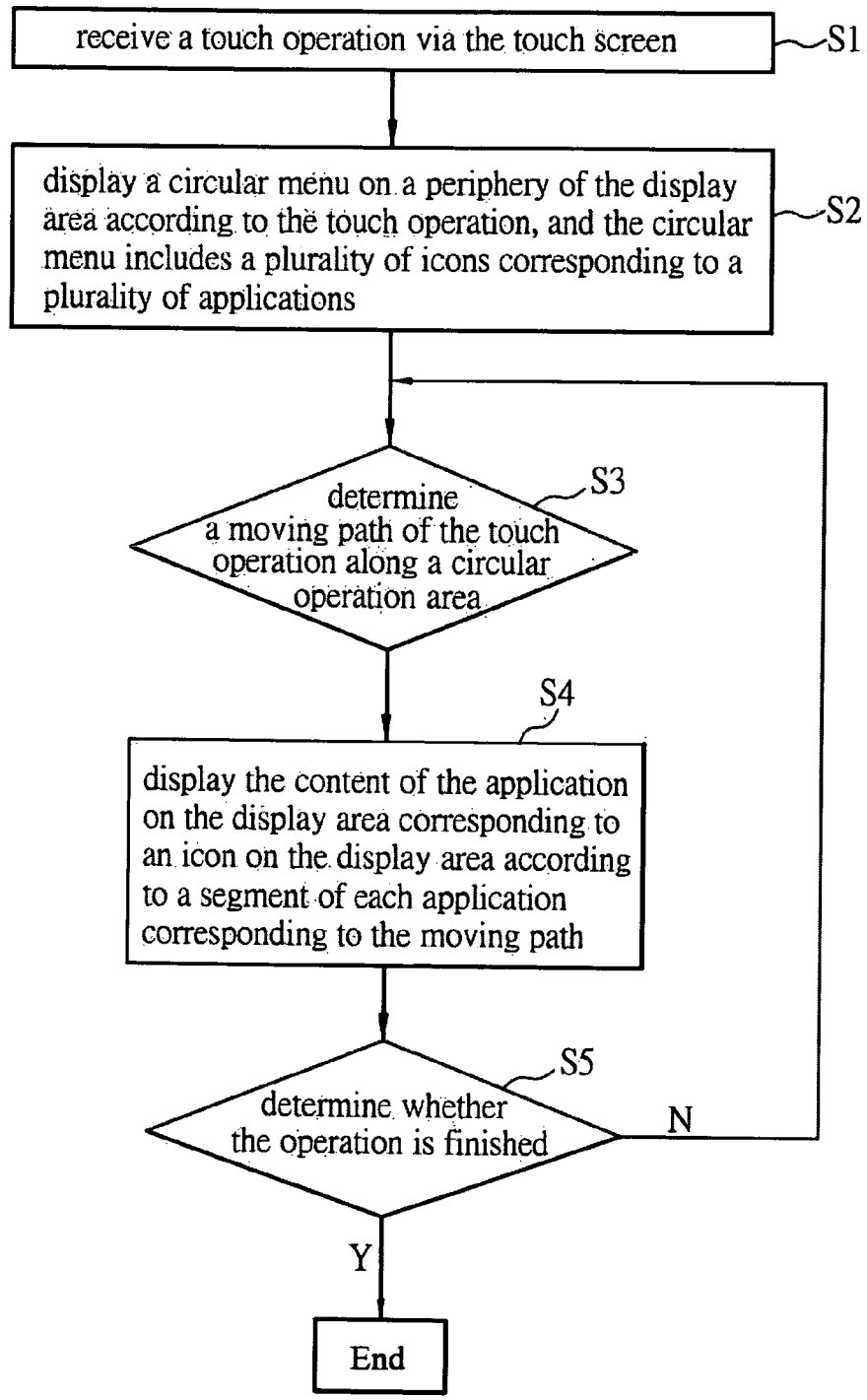
FIG. 5A is a flow chart showing an interface switching method in an embodiment.
Figure 5B:
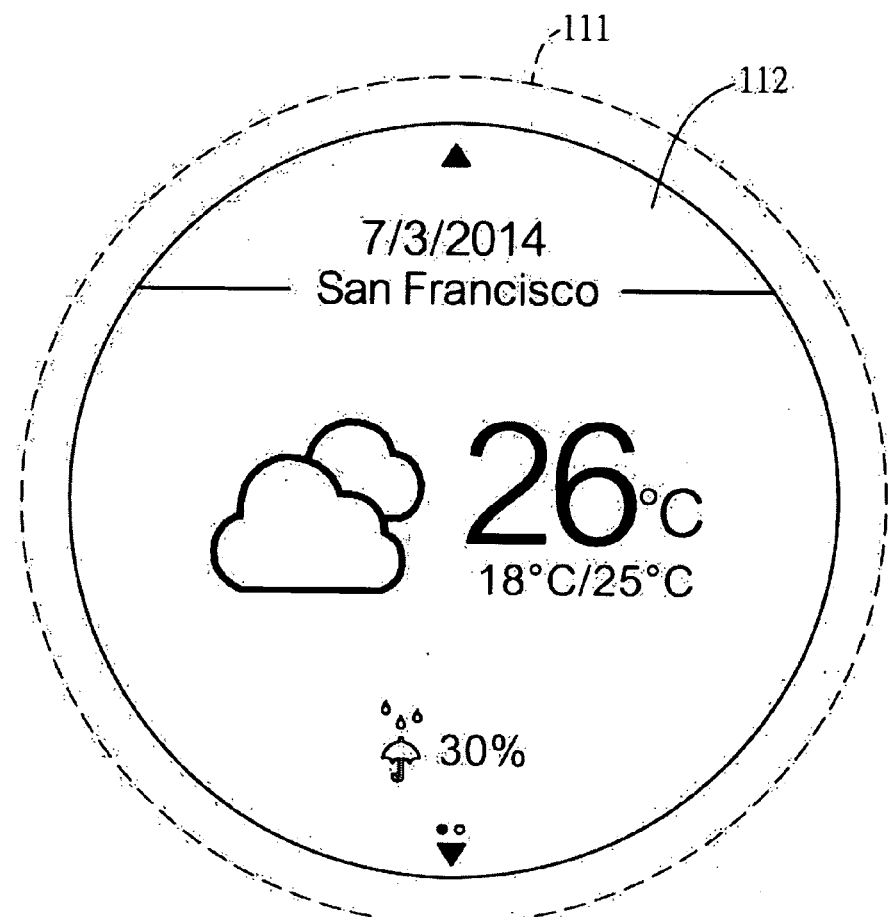
FIG. 5B is a schematic diagram showing a graphical user interface of the electronic device in FIG. 1B.

In step S5, the processing unit 13 determines whether the moving path of the touch operation is generated. In an embodiment, the processing unit 13 determines the generating of the moving path of the touch operation by detecting whether the finger (or other touch objects) leaves the touch screen 11. When the final touch position P3 is generated, the touch screen 11 does not display the circular menu 113. In an embodiment, the circular menu 113 hides by the way of leaving away from the display area 112 or fading out. As a result, the display area 112 only displays the content of the application. As shown in FIG. 5B, when the touch operation moves to the icon 1131 corresponding to the weather application, the display area 112 displays the content of the weather application, and when the touch operation is finished, the circular menu 113 hides. In addition, when the touch operation is not finished, that is the final touch position P3 is not generated, the processing unit 13 continues to have the above determination, and the touch screen 11 still displays the circular menu 113, and the display area 112 continues to change the display content corresponding to the moving path P2 of the touch operation on the circular operation area 111.

Figure 6:
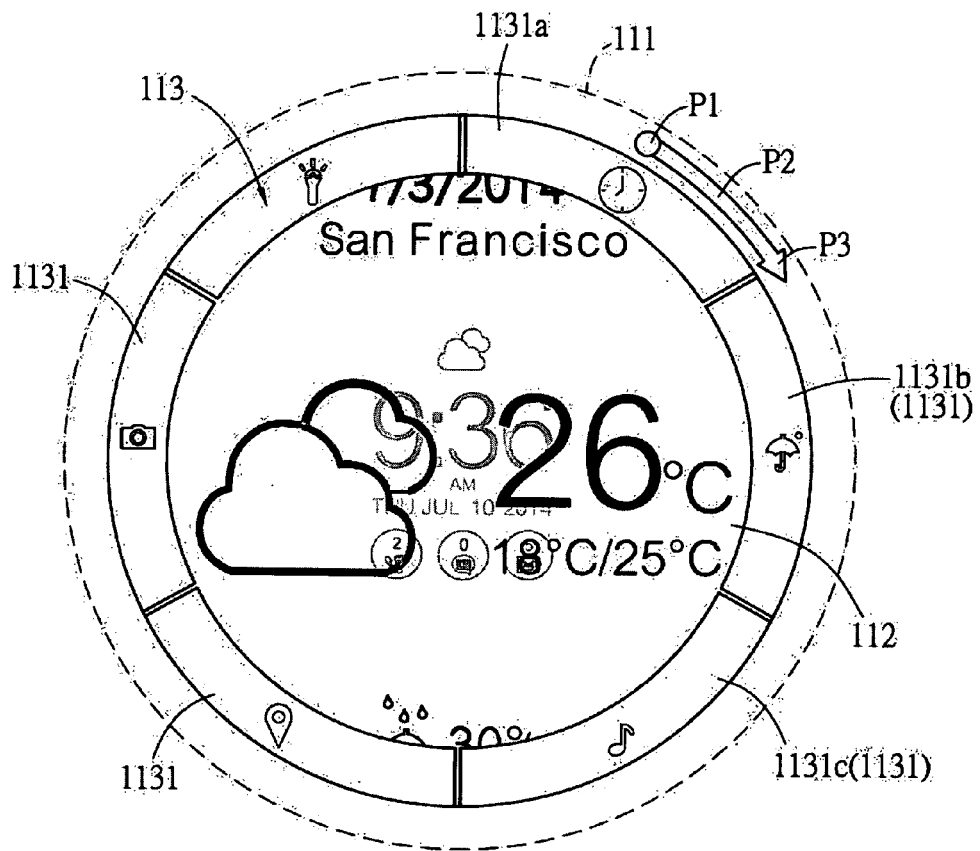
FIG. 6 is a schematic diagram showing a graphical user interface of the electronic device in FIG. 1B.

In an embodiment, when the moving path of the touch operation moves to the divider line between two adjacent icons, the image the display area 112 displays an overlay image of the contents of the applications corresponding to the two icons. As shown in FIG. 6, the display area 112 displays the overlay image of the content of the time application and the weather application.

Although the disclosure has been disclosed with reference to certain preferred embodiments thereof, the disclosure is not for limiting the scope. Persons having ordinary skill in the art may make various modifications and changes without departing from the spirit and the scope of the disclosure. Therefore, the scope of the appended claims should not be limited to the description of the preferred embodiments described above.

What is claimed is:

1. An electronic device, comprising:
 a touch screen configured to display a ring-shaped operation area and a display area, wherein the display area is disposed within the ring-shaped operation area;
 a storage unit configured to store a plurality of applications; and
 a processing unit coupled to the touch screen and the storage unit,
 wherein a ring-shaped menu is generated on the touch screen by a single touch operation, and the ring-shaped menu has a plurality of icons,
 wherein an application corresponding to one of the plurality of icons is activated by touching a position outside the ring-shaped menu and adjacent to the icon so as to display content of the application inside the display area.

2. The electronic device according to claim 1, wherein the processing unit determines a moving path on the ring-shaped operation area, and the display area switches to display content of the application corresponding to the icon according to a change of the moving path.

3. The electronic device according to claim 2, wherein the processing unit determines an initial touch position of the moving path, and the processing unit determines segments corresponding to icons of the applications according to the initial touch position and the application corresponding to the content currently displayed on the display area.

4. The electronic device according to claim 2, wherein when the processing unit detects that the moving path is within a segment of the icon of the application and determines to zoom in or zoom out an image of the display area according to a moving direction of the moving path.

5. The electronic device according to claim 2, wherein the processing unit determines whether a final touch position of the moving path is generated, if the final touch position of the moving path is generated, the touch screen does not display the ring-shaped menu.

6. An interface switching method, applied to an electronic device with a touch screen, wherein the method includes the steps:

providing a circular display area and a ring-shaped operation area on the touch screen, wherein the circular display area is disposed within the ring-shaped operation area;

generating a ring-shaped menu on the touch screen by a single touch operation, wherein the ring-shaped menu has a plurality of icons;

performing a moving path along the ring-shaped operation area, wherein the moving path is disposed outside the ring-shaped menu and adjacent to one of the plurality of icons; and activating an application corresponding to the icon so as to display content of the application inside the circular display area.

7. The method according to claim 6, wherein the step of displaying the ring-shaped menu further includes:

determining an initial touch position of the moving path and defining a segment of each icon of the ring-shaped menu according to the initial touch position.

8. The method according to claim 7, further comprising:

displaying the ring-shaped menu on the periphery of the circular display area, wherein the segment of the icon corresponding to the initial touch position corresponds to the application whose content is currently displayed inside the circular display area.

9. The method according to claim 6, further comprising:

determining whether to zoom in or zoom out an image of the circular display area according to a moving direction of the moving path within a segment of the icon.

10. The method according to claim 6, further comprising:

if a final touch position of the moving path is generated, the touch screen does not display the ring-shaped menu.

\* \* \* \* \*